United States Patent [19]

Vowles

[11] 4,367,020

[45] Jan. 4, 1983

[54] PROJECTION DEVICE AND LOOP BOX THEREFOR

[75] Inventor: Jaren P. Vowles, Centerville, Utah

[73] Assignee: Corporation of the President of The Church of Jesus Christ of Latter-Day Saints, Salt Lake City, Utah

[21] Appl. No.: 29,649

[22] Filed: Apr. 13, 1979

[51] Int. Cl.³ .................... G03B 21/00; B65H 75/02
[52] U.S. Cl. .................... 353/120; 242/55.01; 352/127; 352/166; 353/122; 353/DIG. 2
[58] Field of Search .................... 352/127, 166; 353/DIG. 2, 120, 121, 122; 242/55.01

[56] References Cited

U.S. PATENT DOCUMENTS

| 1,607,740 | 11/1926 | Griffiths | 352/127 |
| 1,634,174 | 6/1927 | Cornett | 352/127 |
| 1,891,225 | 12/1932 | Fear | 242/55.01 |
| 2,101,126 | 12/1937 | Babb | 352/127 |
| 3,139,790 | 7/1964 | Kipping | 352/166 |
| 3,680,803 | 8/1972 | Takata | 242/55.01 |

Primary Examiner—Steven L. Stephan
Attorney, Agent, or Firm—George H. Mortimer

[57] ABSTRACT

A projection device comprising a film projector and a loop box for a continuous film in which the projector includes a sprocket for feeding the continuous loop of film through a film gate which may be of the customary type. The loop box comprises a frame having transversely and longitudinally spaced upper and lower shaft supports, a plurality of shafts journaled in each of said upper and lower shaft supports, a plurality of pulleys rotatably mounted on each of the shafts by means of ball bearings and means to drive each shaft in the direction which the rollers mounted thereon move when the film loop is advanced through the film gate by the drive sprocket.

5 Claims, 4 Drawing Figures

PROJECTION DEVICE AND LOOP BOX THEREFOR

INTRODUCTION

The present invention relates to a projection device comprising a film projector and a loop box. The projector may be of any construction, e.g., any customary film projector which has feed sprockets driven by a motor for properly advancing a film through a film gate. The loop box, which is adapted to hold a film loop or continuous film to be fed to the projector, comprises a frame having transversely and longitudinally spaced upper and lower shaft supports and a plurality of shafts journaled in each of said upper and lower shaft supports. Each shaft carries a plurality of pulleys rotatably mounted thereon by low friction bearings, such as ball bearings, roller bearings, or the like. The film loop which passes around these pulleys and the feed sprockets, is advanced through the film gate whenever the projector motor is activated to drive the feed sprockets. In order to overcome inertia in the system and reduce stress on the film by the feed sprockets, means are provided for driving the shafts in the direction in which the pulleys rotate when the feed sprockets advance the film loop.

BACKGROUND OF THE INVENTION

The combination of a film projector with a loop box for projecting intelligence recorded on a continuous loop of film is known in the art. See for example Griffith's U.S. Pat. No. 1,607,740 granted Nov. 23, 1926, Cornett U.S. Pat. No. 1,634,174 granted June 23, 1927 and Babb U.S. Pat. No. 2,101,126 granted Dec. 7, 1937.

Projection devices of the kinds illustrated in these prior art patents are primarily used for projecting a series of pictures and a message connected therewith. The message may either be printed as part of the film or be a separate sound track to give a verbal message accompanying the projection of the pictures on the film. It is customary for the projector to operate through one cycle and then stop until the operation of the apparatus is initiated for another cycle. The stopping and the starting is customarily controlled by the sprockets on the projection device at each side of a film gate, as those skilled in the art understand. The start up of the film loop from a resting position to a moving position places considerable stress on the film adjacent to the feed sprockets and it has been found by experience that there is a tendency to enlarge by tearing the sprocket holes in the film strip through which the teeth on the feed sprockets pass in order to have a positive drive of the film through the film gate. Such tearing soon makes the film loop unusable.

The Babb Patent recognizes that it is desirable to provide a device of this kind with a film feeding means that avoids or minimizes the development of this undesirable stress in the film and insures the proper functioning of the film feeding mechanism. See page 2, right column, lines 52 and following. Babb discloses means to accomplish this purpose including the sprocket wheels 33, 34 and 45 mounted on spindles which are driven at the same peripheral speed as the sprocket wheel forming part of the feeding mechanism 28 of the projector. See page 3, right column, lines 29 and following.

SUMMARY OF THE INVENTION

The present invention differs from the projection devices of the prior art, e.g., as represented by the Babb Patent, which require expensive parts and maintenance to obtain accurate synchronization of the drive mechanism for the sprockets in the loop box with the drive mechanism for sprockets of the film projector, in that the pulleys or sprockets in the loop box are not positively driven. Instead drive means are provided for rotating the shafts on which the pulleys that carry the film loop are mounted in the direction in which the pulleys will rotate when the film advances. This structure greatly minimizes the inertia in the system. It permits free relative rotation between the pulleys and their shafts but assists their rotation in the right direction by the normal friction between the pulleys and their rotating shafts. The film advances without substantial stress so that there is no tendency to tear the film in the vicinity of the sprocket holes.

DETAILED DESCRIPTION OF THE INVENTION

The detailed description of the structure and manner of operation of the best embodiment of the invention presently known is made in conjunction with the drawing in which.

Figure 1:
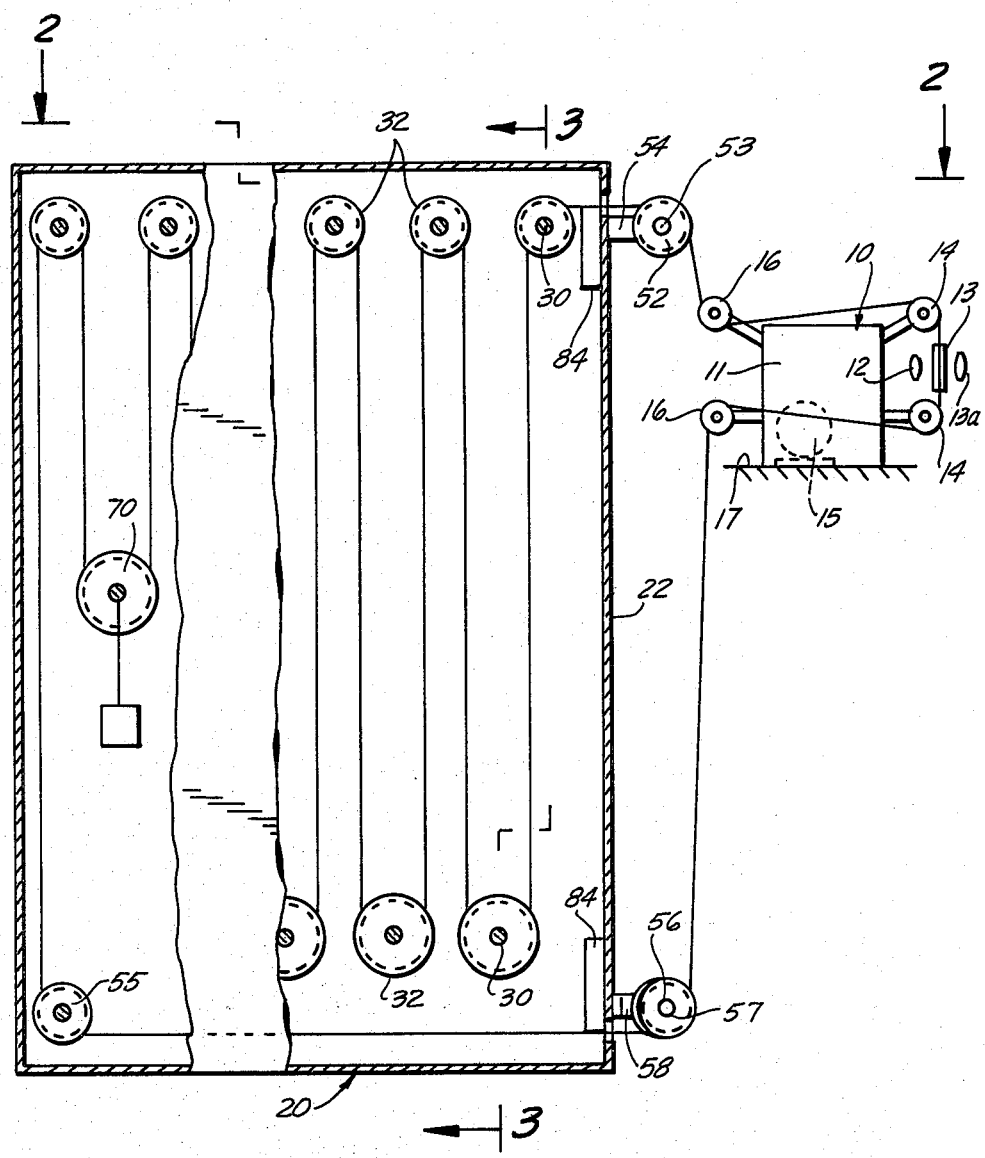
FIG. 1 is a side view of the invention, with portions in section along the line 1—1 of FIG. 2.

Referring to FIG. 1, the device of the invention includes a film projector 10 and a film loop box 20.

The film projector 20 comprises a box 11 having an illuminating system with a condensing lens 12, a film gate 13, a projection lens 13a and driven sprockets 14 at each side of the film gate 13. A motor 15, usually mounted within the box 11, is provided which has means (not shown in detail but of well known structure) for driving the sprockets 14 to feed film through film gate 13 in the proper manner for projecting the intelligence on the film. Idler sprockets or pulleys 16 are provided on the box 11 for guiding the film to and from the feed sprockets 14, as seen in FIG. 1. The film box is mounted on a suitable support 17 which may be supported in any suitable manner on or adjacent to the loop box 20.

Figure 3:
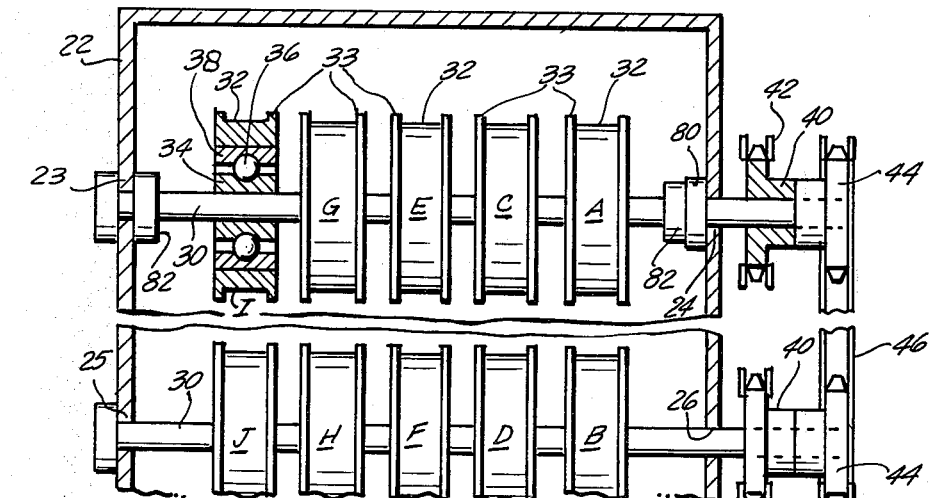
FIG. 3 is a fragmentary sectional view of the apparatus along the line 3—3 of FIG. 1.

The loop box 20 comprises a frame 22, which may be of any desired construction, comprising, as seen in FIG. 3, a pair of upper shaft supports 23 and 24 and a pair of lower shaft supports 25 and 26. The shaft supports of each pair are transversely spaced with respect to each other. The shaft supports of the upper pair 23 and 24 are longitudingly spaced from the lower pair of shaft supports 25 and 26. Shafts 30 are journaled in the upper and lower shaft supports so as to be rotatable in the journals.

A plurality of pulleys 32 are mounted on each shaft. Each pulley preferably has raised flanges 33 at each side which serve as film guides. The preferred mounting for each pulley includes a low friction bearing such as a ball bearing, roller bearing, sleeve bearing, or the like. In the drawings, ball bearings are depicted but it is to be understood that any form of low friction bearing may be used as an equivalent.

Referring to FIG. 3, it will be seen that a ball bearing is provided to mount the upper left roller 32 on its shaft 30. All other rollers 32 are similarly mounted on their respective shafts. The bearing comprises an inner race 34, a series of balls 36 and an outer race 38. The inner race is press fit or otherwise secured to the shaft 30 whereas the outer race 38 is press fit or otherwise secured to the pulley 32. It will be understood from this description that the pulley is freely rotatable upon the shaft 30 with the movement occurring between the inner and outer races at a relatively low friction loss because of the ability of the balls to rotate whenever there is differential rotary movement between the inner and outer races.

Each shaft 30 is illustrated as extending outwardly beyond the frame 22 at one end far enough to receive at least one sprocket 40 for a chain 42.

At least one of the shafts 30 journaled in the upper shaft supports and at least one of the shafts 30 journaled in the lower shaft supports is also long enough to have secured thereto a sprocket 44. A chain 46 is provided around these sprockets 44 so that these shafts rotate in synchronism.

Figure 2:
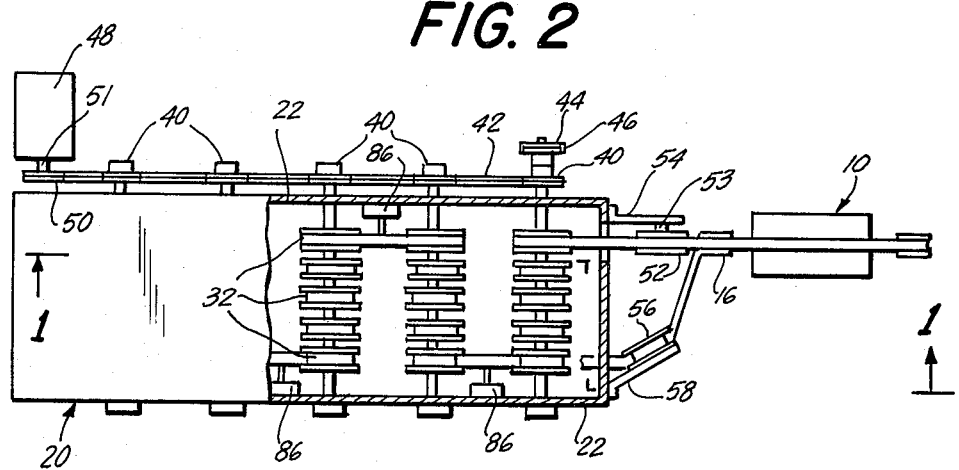
FIG. 2 is a plan view of the device with a portion of the film box in section along the line 2—2 of FIG. 1.

A motor 48 is provided which has a sprocket 50 secured directly or through a speed reduction mechanism (not shown) to its shaft 51. It may be mounted in any suitable manner on or adjacent to the frame 22 with its sprocket 50 aligned with sprocket 40 of the next adjacent shaft 30, as seen in FIG. 2. The chain 42 goes around the sprocket 50 and the sprockets 40 of either the upper or lower series of shafts. A similar chain 42 goes around all of the sprockets 40 of the other series of shafts. All of the sprockets 40, 44, and preferably also sprocket 50, have the same diameter. It will be understood that when the motor 48 operates, its sprocket 50 drives chain 42 and all of the sprockets 40 in contact therewith, that the movement of chain 42 also causes sprocket 44 to rotate and drive chain 46 and through it the series of sprockets 40 secured to the shafts in the other series so that all of the shafts 30 rotate similtaneously and in synchronism in response to the movement of the shaft 51 of motor 48.

An idler roller 52 mounted on shaft 53 on bracket 54 is secured to frame 22 in alignment with a row of rollers on the upper end of the frame to guide the film from the loop box to the upper idler roller 16 on the projector, from which it passes over sprocket 14 into the film gate 13. An idler roller 56 mounted on shaft 57 on bracket 58 is secured to frame 22 in alignment with an idler roller 59 on the bottom end of the frame to guide the film leaving the film gate by lower sprocket 14 and lower idler roller 16 into the loop box, as seen in FIG. 1 and 2.

Figure 4:
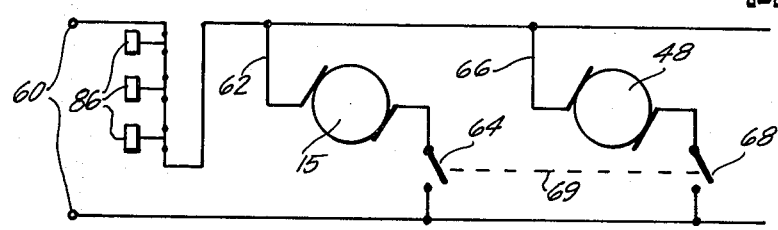
FIG. 4 is a schematic wiring diagram of the supply system for the two motors.

Referring to FIG. 4, the electrical system comprises a supply line 60 with motor 15 and motor 48 connected in parallel across it. The connection for motor 15 comprises a line 62 having a switch 64 therein so that motor 15 can be selectively energized from the power line 60, as desired. The connection for motor 48 comprises a line 66 having a switch 68 therein so that motor 48 can likewise be selectively operated. A mechanical or electronic interlock, schematically represented by broken line 69 between switches 64 and 68, may be provided, if desired, to assure the closing of switch 68 no later than the closing of switch 64 so that shafts 30 are rotating at the time the film loop begins to move.

It is desirable to provide means for maintaining the continuous loop in the film box and the feed system to the projector at the proper tension. A simple and convenient yet throughly satisfactory way to accomplish this is to provide a dancer pulley 70 which is properly weighted to provide the proper tension on the entire film loop and to run freely in a specially provided take-up loop of the film as shown in FIG. 1. Those skilled in the art are familiar with this type of device for imparting proper tension to a continuous loop of film.

Instead of providing an extra pulley 44 on only one shaft in the upper and lower series, a second pulley may be mounted on each shaft. A short chain may then be used around the motor sprocket and the outer sprocket on the closest shaft, a second chain may go around the inner sprocket on the first shaft and the inner sprocket on the second shaft, a third chain may go around the outer sprocket on the second shaft and the outer sprocket on the third shaft, a fourth chain may go around the inner sprocket on the third shaft and the inner sprocket on the fourth shaft, and so on until all shafts are connected by chains as described. The extra pulley on the end shaft remote from the motor is then used in the manner described above to transfer the motion from the motor driven series of shafts at one end of the frame to the second series of shafts at the other end of the frame. The second series of shafts may also have two sprockets per shaft as described for the first series with similar short connecting chains.

The film used in the projection device is first threaded as a long strip over the pulleys or rollers and then spliced together at the free ends to form the continuous loop after the device has been properly loaded. There are two ways of threading the film. In one way, the film is threaded first around the aligned most distant end rollers on each shaft as indicated in FIG. 1. It is convenient to thread an end of the film strip around the end roller on the upper end shaft closest to the projector, then go downwardly to the end pulley on the lower end shaft and continue to thread from bank to bank. The film is threaded from bank to bank as described, until the second roller at the top from the left side of the loop box is reached where tension means is preferably provided by means of a dancer 70, as seen in FIG. 1, and described hereinabove. From the end roller of the first series the film is passed in the same way around the second series of rollers on each shaft, then the third series, etc. until all required for the strip of film to be projected have been used. The film from the last roller is passed around an idler roller 55 below it to an idler roller 56 on a shaft 57 mounted in a bracket 58 on box 22.

The film moving from the projector into the film box passes over lower sprocket 14, lower idler roller 16, idler roller 56 and idler roller 55, and back to the projector over the series of rollers described.

The second way to thread the film is to pass the end around the upper most distant roller of the first shaft (roller A, FIG. 3), then in succession down around roller B, up around roller C, down around roller D, and so on around rollers E, F, G, H, I and J. From J on the first shaft, the film goes to roller J in the next bank of rollers on the second shaft and in succession around rollers I, H, G, F, E, D, C, B and A thereon. From A on the second shaft, the film goes successively around rollers A, B, C, D, E, F, G, H, I and J on the third shaft, and so on until it has passes around all the rollers on all the shafts. At same roller in the next to last shaft, the loop for the tension loop and dancer pulley 70, above described, is provided.

The distance between the upper and lower pulleys is such that the cross-over from one pulley in a series (e.g., B pulleys) to a pulley in the next series (e.g., pulley C) is possible without putting the shaft for the pulley on an angle. The flanges 33 on the pulleys (e.g., B and C, respectively) guide the film properly partially around the pulleys even on cross-over from one series to the next so that the film runs true. There is enough yield or give in the film strip to enable it to run true on the cross-overs with the aid of the flanges 33.

The means for journaling the ends of the shafts 30 in the frame 22 may, if desired, include pillow boxes 80 suitably fastened either to the outside of the frame piece, as shown to the left of FIG. 3, or to the inside, as shown at the right of FIG. 3. Collars 82 may be secured to shafts 30, e.g., by set screws, to prevent undesired end play.

The number of film rollers 32 mounted upon each shaft may vary from one to a dozen or more, depending (a) upon the length of the film which it is desired to mount in the box, (b) upon the number and spacing of the shafts in the upper and lower series, and (c) upon the longitudinal spacing between the upper and lower series of pulleys.

It will be understood that all of the sprockets 32 on the shafts 30 have the same diameter so that the speed of rotation of each shaft is the same as the speed of rotation of all the other shafts. It is important to thread the film so that each roller on each and every shaft turns in the same direction as the film is advanced through the film box.

In order to minimize or eliminate static on the film, static neutralizers 84 of any desired contruction may be mounted on the framework 22, e.g., one neutralizer adjacent to the idler roller 56 and another adjacent to the idler roller 52. Such static neutralizers are known to those skilled in the art.

Provision is desirably made to stop the movement of the film in case it breaks during the projection. For this purpose, a micro switch 86 is provided at one place, at least, and preferably at each place, where the film passes from a roller on one shaft to the roller on the next shaft, e.g., as shown in FIG. 2, which may be threaded in the second way described above. Thus, where the film from roller J on the first shaft passes on to roller J on the second shaft, a microswitch 86 is mounted so that an arm on the switch is held by the film in closed position as long as the film is continuous (unbroken). Similarly, where the film passes from roller A on the second shaft to roller A on the third shaft, a microswitch 86 is mounted so that the arm thereon is also held by the film in closed position. All of the microswitches are connected in series, as shown for three switches in FIG. 4, so that if any one or more of them opens upon breakage of the film the power to motors 15 and 48 is broken. Any number of switches 86 may be used, as desired. The film comes to a stop quickly, usually within 10 frames of movement if the film breaks and permits any microswitch to open.

It is desirable to provide a cover 90 for the film box preferably of a transparent material, e.g., an acrylic plastic, to keep dust out of the box while permitting viewing of the interior.

Although the invention has been described and illustrated in connection with certain specific embodiments, it will be understood that modifications and variations may be made without departing from the principles of the invention as described.

Having thus described and illustrated the invention, what is claimed is:

1. A projection device comprising a film projector and a loop box for a continuous film; said projector comprising a film gate, a feed sprocket at each side of said film gate for feeding film through said film gate and means to drive said feed sprockets; said loop box comprising a plurality of upper and lower rotatably mounted shafts having rollers rotatably mounted thereon, said rollers adapted, with the feed sprockets of said projector, to hold a continuous strip of film, each said roller being rotatable on its shaft by movement of the film in contact with it, and means for driving said shafts in the direction in which the rollers move when said feed sprockets are driven to feed the film through said film gate.

2. A loop box for a continuous film comprising a frame having transversely and longitudinally spaced upper and lower shaft supports, a plurality of shafts journaled for rotation in each of said upper and lower shaft supports, a plurality of pulleys rotatably mounted on each of said shafts around which said film is adapted to be looped, each and every pulley on each and every shaft having its rotatable mounting include a ball bearing, and means to drive each shaft in synchronism with all the other shafts.

3. A loop box for a continuous film comprising a frame, a plurality of rollers around which said continuous film is adapted to be looped, a plurality of shafts for said rollers journaled in said frame, each said roller being mounted for rotation on its shaft when said film is moved, and means for rotating the shafts in the direction that the rollers move when the film is moved to project pictures on it so as to reduce inertia in the system when the film is moved and thereby facilitate starting of the film.

4. In a projection device for a continuous loop of film threaded around rollers rotatably mounted on shafts, said rollers being rotated by said film when it is advanced, the improvement which comprises means for driving said shafts independently of the movement of said rollers in the direction the rollers rotate when the film is advanced.

5. In a projection device as set forth in claim 4, the further improvement which comprises means for driving said shafts at least as soon as movement of the film starts.

* * * * *